(12) United States Patent
Wiley

(10) Patent No.: US 8,201,101 B2
(45) Date of Patent: Jun. 12, 2012

(54) RESOLUTION INDEPENDENT LAYOUT

(75) Inventor: David Wiley, Woodland, CA (US)

(73) Assignee: Stratovan Corporation, Woodland, CA (US)

( * ) Notice: Subject to any disclaimer, the term of this patent is extended or adjusted under 35 U.S.C. 154(b) by 775 days.

(21) Appl. No.: 12/262,119

(22) Filed: Oct. 30, 2008

(65) Prior Publication Data

US 2009/0144652 A1 Jun. 4, 2009

Related U.S. Application Data

(60) Provisional application No. 60/984,332, filed on Oct. 31, 2007.

(51) Int. Cl.
*G06F 17/00* (2006.01)
*G06F 3/048* (2006.01)

(52) U.S. Cl. .......................... 715/800; 715/238; 715/801

(58) Field of Classification Search .................. 715/794, 715/815, 800, 204, 238, 801
See application file for complete search history.

(56) References Cited

U.S. PATENT DOCUMENTS

| | | | | |
|---|---|---|---|---|
| 5,796,401 A * | 8/1998 | Winer | ............................ | 345/619 |
| 6,414,698 B1 * | 7/2002 | Lovell et al. | .................. | 715/800 |
| 7,484,182 B1 * | 1/2009 | Smith | ............................ | 715/794 |
| 7,712,045 B2 * | 5/2010 | LeMay et al. | ................. | 715/788 |
| 7,818,684 B1 * | 10/2010 | Smith | ............................ | 715/794 |
| 7,949,954 B1 * | 5/2011 | Jezek, Jr. | ....................... | 715/800 |
| 2003/0146934 A1 | 8/2003 | Bailey et al. | | |
| 2006/0284878 A1 * | 12/2006 | Zimmer | ......................... | 345/581 |
| 2007/0171233 A1 | 7/2007 | Zimmer | | |
| 2007/0180391 A1 | 8/2007 | Zimmer et al. | | |
| 2007/0220437 A1 | 9/2007 | Boillot | | |

OTHER PUBLICATIONS

International Search Report issued May 22, 2009 in corresponding PCT/US08/81874.

* cited by examiner

*Primary Examiner* — Tadeese Hailu
*Assistant Examiner* — Nicholas Ulrich
(74) *Attorney, Agent, or Firm* — Mark J. Danielson; Pillsbury Winthrop Shaw Pittman LLP

(57) ABSTRACT

Systems and methods are described for positioning graphical objects and elements of graphical objects including widgets. At least two source layouts are selected, each source layout proportioning elements of the graphical object to be positioned. An interpolated layout is generated from the source layouts whereby the graphical object is positioned based on the interpolated layout. Multiple elements may be processed so. Elements of the graphical object can be proportioned differently from one another and the source layouts may be selected based on their relationship in size to the size of a desired runtime layout. The elements can include widget regions and content within the widget regions may be scaled independently of the positioning of the widget regions. The methods may be incorporated in a machine readable medium as data and executable instructions.

20 Claims, 14 Drawing Sheets

Example User Interface Designs and Runtime Layouts

Layout Design Definition A
(405 x 305) 1401

Layout Design Definition B
(804 x 604) 1402

Runtime Layout A
(600 x 400) 1403

Runtime Layout B
(314 x 496) 1404

Runtime Layout C
(942 x 319) 1405

RESOLUTION INDEPENDENT LAYOUT

CROSS-REFERENCE TO RELATED APPLICATIONS

The present Application claims priority from U.S. Provisional Patent Application No. 60/984,332 filed Oct. 31, 2007, entitled "Resolution Independent Layout," which is expressly incorporated in its entirety herein.

BACKGROUND OF THE INVENTION

1. Field of the Invention

The present invention relates generally to methods for graphical layout and more particularly to methods for optimizing graphical layout resizing.

2. Description of Related Art

In the computing arts, two primary elements required for providing a user interface ("UI") are development stage layout design and runtime layout during, for example, execution of an application. In designing a layout, a UI designer specifies locations of individual UI elements or widgets such as buttons, list boxes, edit boxes, custom controls, and so on.

Conventional systems often use a variety of mechanisms to specify widget locations that are later used during runtime to perform the actual UI layout. These range from WYSIWYG design tools allowing drag-n-drop placement of widgets to handwritten program code defining widget locations. Runtime UI layouts are either (i) fixed, (ii) dynamic, (iii) user adjustable, or (iv) some combination of those. A fixed UI uses the same layout definition for all cases or limits the layout dimensions to a certain size and is trivial to implement for runtime by using the source design throughout the software session. Any sort of dynamic UI poses the difficult problem of resizing or repositioning widgets to appropriate positions for arbitrary and otherwise unknown layout dimensions. Conventionally, in complex UI layouts, the only reasonable solution to this problem has been to hand code the dynamic layout logic. This hinders modification of the UI due to the complexity associated with integrating design changes into the underlying dynamic repositioning algorithm.

In some conventional systems, frameworks are implemented which specify the relationships between widgets, for example, tying the edge of one widget to another such that, when one widget is moved, those dependent on it move accordingly. Regardless of these tools, complex UI layouts involving multiple configurations require some amount of hand coding by a programmer to achieve user-friendly runtime results.

Layout logic describing how the boundaries for a widget change during a resize event is usually based on some combination of the following rules:

1) Leave the widget boundary in its current state.
2) Use a fixed boundary width or height for all layout sizes.
3) Variable boundary width or height filling a region of space.
4) Adjust the boundary relative to another boundary (possibly that of another widget), for example, having a constant offset from an edge.
5) Scale the boundary based on a percentage of the new dimensions derived from its current location and/or the single input layout definition.

Due to such complexity, conventional software applications have little or no support for dynamic user interface layouts and employ fixed size layouts that result in dialog boxes or application windows that cannot be resized. Furthermore, in conventional systems, a preselected set of layout sizes are typically defined, such as 640×480, 800×600, 1280×1024 etc., and a layout definition is selected to match the runtime dimensions (this is commonly used in video game design and HTML). Additionally, conventional systems often have resizing logic moving widgets based on rules derived from a single layout definition; the culmination of these rules constitute the UI resizing function.

BRIEF SUMMARY OF THE INVENTION

Certain embodiments of the present invention comprise systems and methods for resolving resolution dependency issues associated with visual elements prevalent in a variety of application areas.

Certain embodiments of the invention employ boundary scaling based on a percentage of changed dimensions and using a plurality of layout definitions. Resizing behaviors can be generated, simulated and/or reproduced through the use of multiple layout definitions. For example, to create a fixed boundary widget, the widget definition in all layouts may have the same size; however, if the boundaries change size in the different definitions, then a corresponding runtime widget can change its size accordingly.

In certain embodiments, methods are provided for interpolating layout design specifications at runtime based on a plurality of layouts in order to determine desired widget locations for arbitrary layout dimensions. Additionally, some methods provide resolution independent layout control (widget content or font scaling) by providing a means to scale widget content at runtime by a user-specified amount.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements.

Certain embodiments of the invention employ methods that address various issues and problems in the art. In certain embodiments, resolution dependency of UI visual elements can be eliminated. For clarity, this description addresses an example related to the design of a user interface (UI) layout for computer software. The example is used in describing aspects of the invention that relate to layout design, which is of primary significance during software development, and runtime layout, which is particularly significant during execution of a program.

Figure 1:
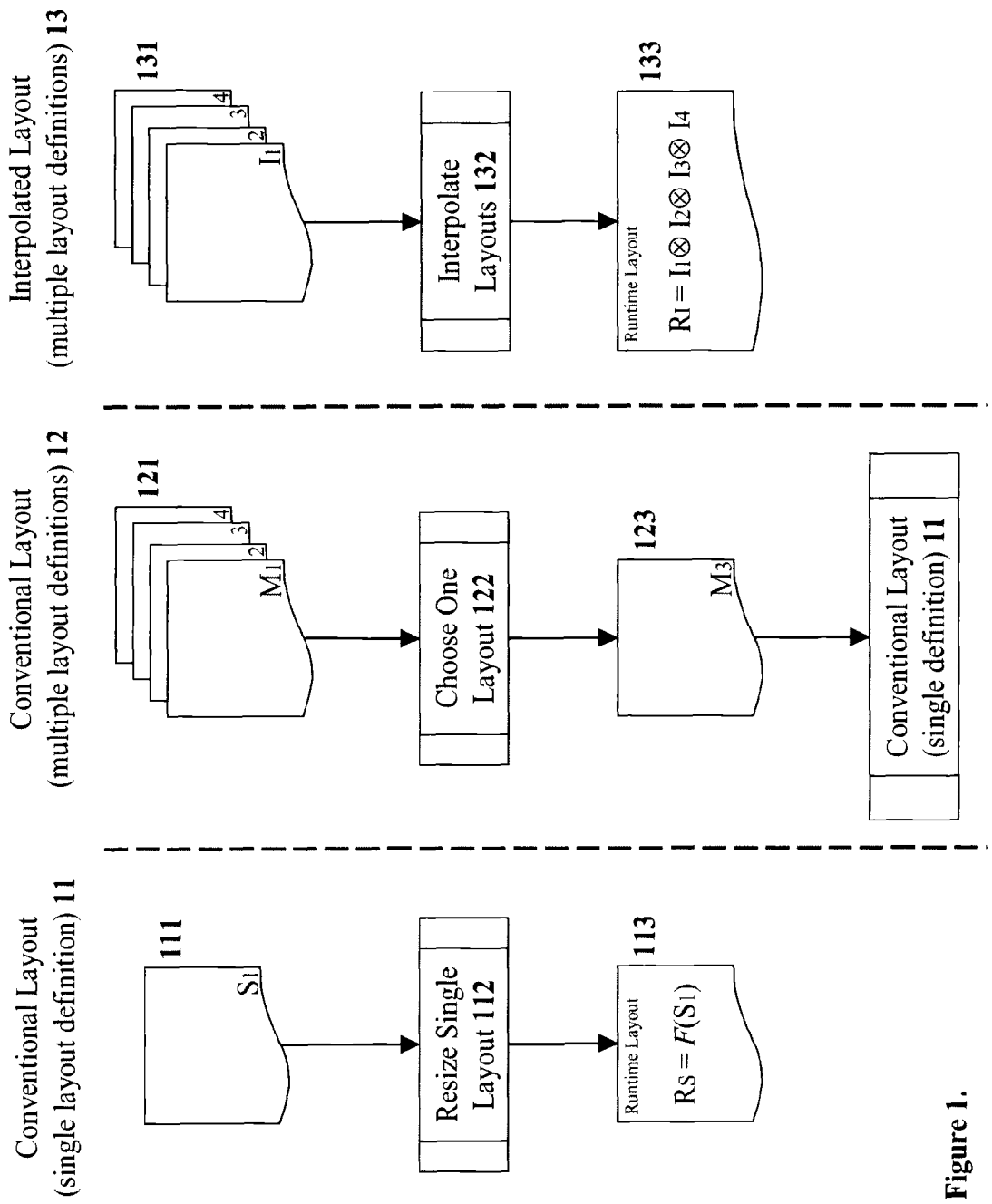
FIG. 1 illustrates layout generation schemes, including schemes according to certain aspects of the invention.

With reference to FIG. 1, embodiments of the invention comprise systems and methods for converting layout design definitions into runtime layout specifications. In a conventional layout 11, a single definition is typically used wherein one source layout 111 is resized 112 at runtime based on predetermined rules, often expressed as a function F that dictates how the widgets on a layout are to be modified in a runtime environment and/or into a dynamic runtime layout. The result is a layout scheme 113 used to determine runtime widget positions based on only one source definition. In other conventional layouts, a layout 123 is selected 122 from multiple layout definitions 121. Thus, a multiple definition layout 12 also uses a single source definition 123 to drive the conventional layout process 11 and the resulting runtime layout is a function of only one source layout definition even though multiple definitions began the process.

In certain embodiments of the invention, a runtime layout is obtained from more than one layout definition. An interpolated layout 13 can process multiple input layouts 131 to produce a runtime layout definition 133 that is a function of more than one input definition. Combination, interpolation, and/or some other form of convolution can be used to process two or more of the multiple input layouts. For example FIG. 1, depicts a system and method that interpolates layouts at 132.

When designing a layout, a UI designer typically specifies locations of individual UI interface elements or widgets such as buttons, list boxes, edit boxes, custom controls and so on. Certain embodiments employ a variety of mechanisms for specifying widget locations that are later used during runtime to perform an actual UI layout. These range from WYSIWYG design tools allowing "drag-and-drop" placement of widgets to hand-coded program code placing widgets at specific locations. However, it will be appreciated that runtime UI layouts can include fixed, dynamic and user-adjustable layouts or some combination of these layouts. In the example 13 of FIG. 1, a layout designer specifies at least two layout definitions. At run-time, a process is performed that interpolates the plural layout definitions and fits selected widgets to arbitrary window dimensions. In one example, two design definitions can be linearly interpolated to obtain appropriate runtime dimensions.

Figure 2:
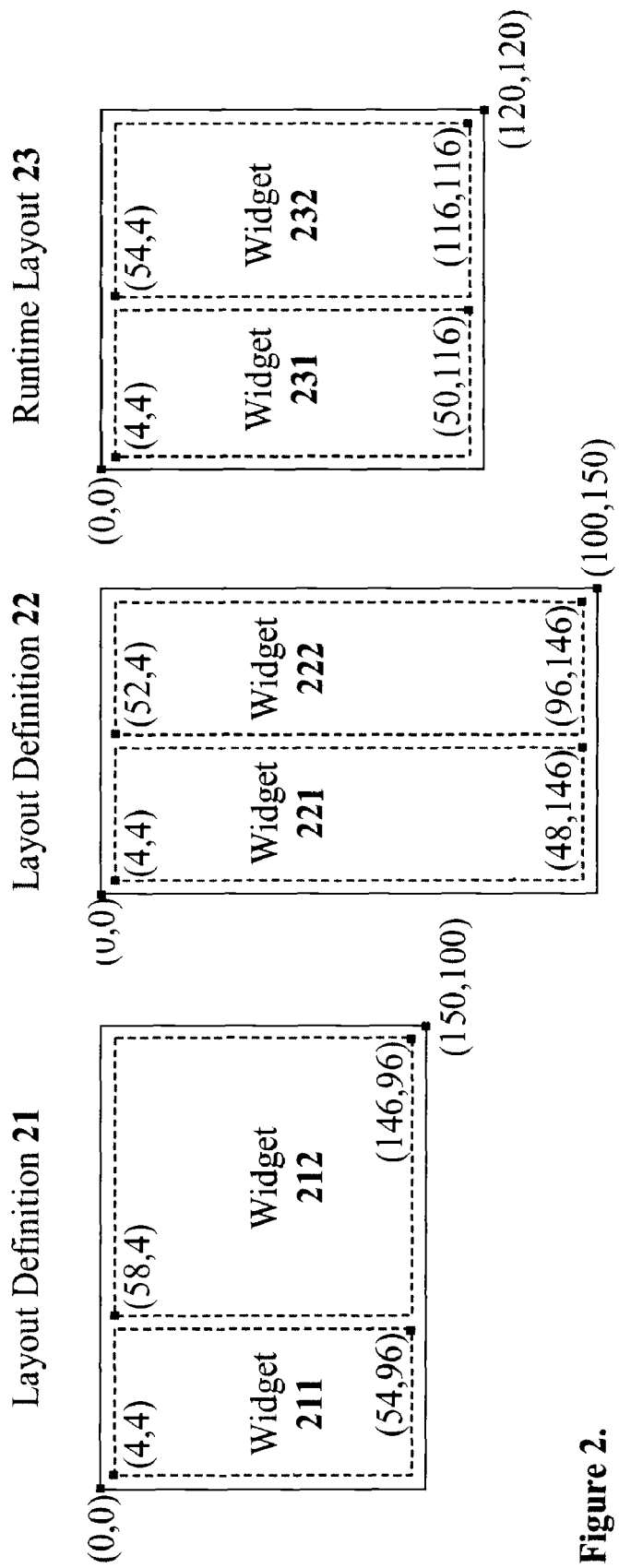
FIG. 2 illustrates simplified use of layout definitions in certain embodiments of the invention.

Turning now to the example of FIG. 2, in certain embodiments, a runtime layout 23 can be generated using two source layouts 21 and 22. As depicted, layout definition 21 is designed to have a width and height of 150 and 100 pixels, respectively, and to have upper-left and lower-right corner coordinates of (0, 0) and (150, 100), respectively. Additionally, two widget regions 211 and 212 are defined for layout definition 21. In this example, widget 211 has upper-left and lower-right corner coordinates of (4, 4) and (54, 96), respectively and widget 212 has upper-left and lower-right corner coordinates of (58, 4) and (146, 96), respectively. As depicted, layout definition 22 is designed for a width and height of 100 and 150 pixels, respectively, and has upper-left and lower-right corner coordinates of (0, 0) and (100, 150), respectively. Two widget regions 221 and 222 are defined for layout definition 22: widget 221 has upper-left and lower-right corner coordinates of (4, 4) and (48, 146), respectively and widget 222 has upper-left and lower-right corner coordinates of (52, 4) and (96, 146), respectively. Runtime layout 23 can be interpolated from layout definitions 21 and 22 based on a runtime width and height of 120 by 120 pixels, respectively. Runtime layout 23 may be described using the upper-left and lower-right coordinates (0, 0) and (120, 120). In this example, runtime interpolation, using one interpolation method, for the size of 120 by 120 pixels and between layout definitions 21 and 22 results in two runtime widget locations 231 and 232: widget 231 has upper-left and lower-right corner coordinates of (4, 4) and (50, 116), respectively and widget 232 has upper-left and lower-right corner coordinates of (54, 4) and (116, 116), respectively.

Typically, interpolation can be performed where runtime dimensions are greater or less than design definitions. The selection of an interpolation scheme can be made based on a variety of factors including the number of available layout definitions, the expected format of the desired runtime layout, correspondence between the desired runtime layout and the available layout definitions, user defined preferences, behavioral characteristics of widgets and operational parameters associated with the user interface.

Figure 3:
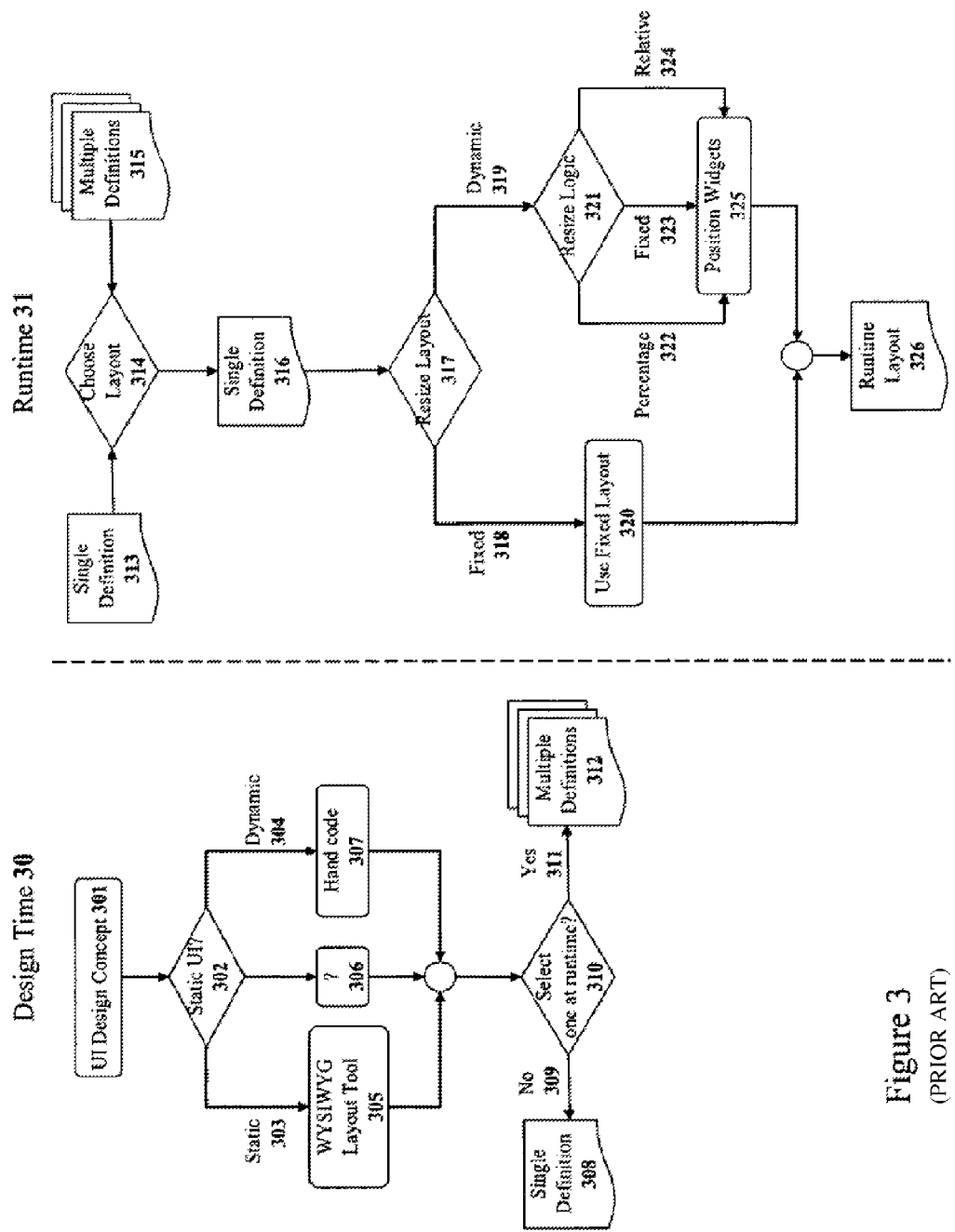
FIG. 3 shows a prior art method of generating runtime layouts.

By way of contrast, an example flowchart describing the conventional UI layout process is shown in FIG. 3. It will be appreciated that the conventional methods shown in FIG. 3 may permit selection of a definition but subsequent operations affect only the single selected definition. The design time flowchart 30 describes the process for specifying layout definition input to computer software. The runtime flowchart 31 describes how the design time layout definition is used to determine runtime layout. For design time, a layout design concept 301 is converted into software input specification by first determining whether the layout will be static or dynamic, decision 302. If static 303, then a WYSIWYG layout tool 305 can be used to specify widget locations and region boundaries for the static layout. If the layout is dynamic 304, the layout itself may need to be fully (or partially) specified by hand coding 307 the layout definition in program source code. Depending upon the complexity of the user interface, some combination of WYSIWYG layout tool 305 and hand coding 307 can be used in 306 to somewhat simplify the hand coding work. The result of all specification methods is either a single layout definition 308 or multiple definitions 312 that can be used as input for specifying widget locations at runtime. During runtime, either the single definition 313 is used or one of the multiple definitions 315 is selected as a best match to the runtime dimension for positioning widgets, as indicated by single definition 316. During a resize event 317, the type of layout dictates how the widgets are positioned. If the layout is fixed 318, then the input layout definition is used to directly specify widget locations 320 and ultimately the runtime layout 326. If the layout is dynamic 319, then the logic driving the layout resizing determines how best to treat each widget based on how that widget's boundaries are supposed to change, for example, as a percentage 322 of the runtime size, as a fixed size 323, or relative 324 to some other boundary or edge. Each widget is then positioned 325 at the newly computed location; resulting in runtime layout 326.

According to certain aspects of the invention, two or more layout design specifications may be interpolated at runtime in order to determine the desired widget locations for arbitrary layout dimensions. Additionally, resolution independent layout control (e.g., widget content or font scaling) may be obtained by providing a means to scale widget content at runtime by a user-specified amount. A layout designer can specify a plurality of layout definitions as an input to an interpolation system. Using the example of FIG. 2, a runtime-layout method interpolates the provided layout definitions at runtime fitting, the widgets to arbitrary window dimensions. In the example, two design definitions are linearly interpolated to fit a runtime dimension. Typically, "small" and "large" versions of the UI can be defined and the designer can optimally place widgets for each layout size. At runtime, the two designs may be interpolated to match the runtime size, producing a smooth blend between the two layouts as the user changes the runtime size between the two input definitions. This method can be used for runtime dimensions larger or smaller than the design definitions. The following formulas can be used to perform the interpolation between two designs.

$$t_w = \frac{(w - w_1)}{(w_2 - w_1)}$$
$$x_w = x_1(1 - t_w) + x_2 t_w$$

and $$t_h = \frac{(h - h_1)}{(h_2 - h_1)}$$
$$y_h = y_1(1 - t_h) + y_2 t_h$$

where w and h are the target dimensions for the new layout, $\{w_1, h_1\}$, and $\{w_2, h_2\}$ are the width and height of the two input layout definitions, $(x_1, y_1)$ and $(x_2, y_2)$ are the coordinates for any homologous point in both layout definitions (not necessarily enclosed within the boundaries of the layout definition), and $(x_w, y_h)$ is the desired coordinate in the new layout.

Figure 4:
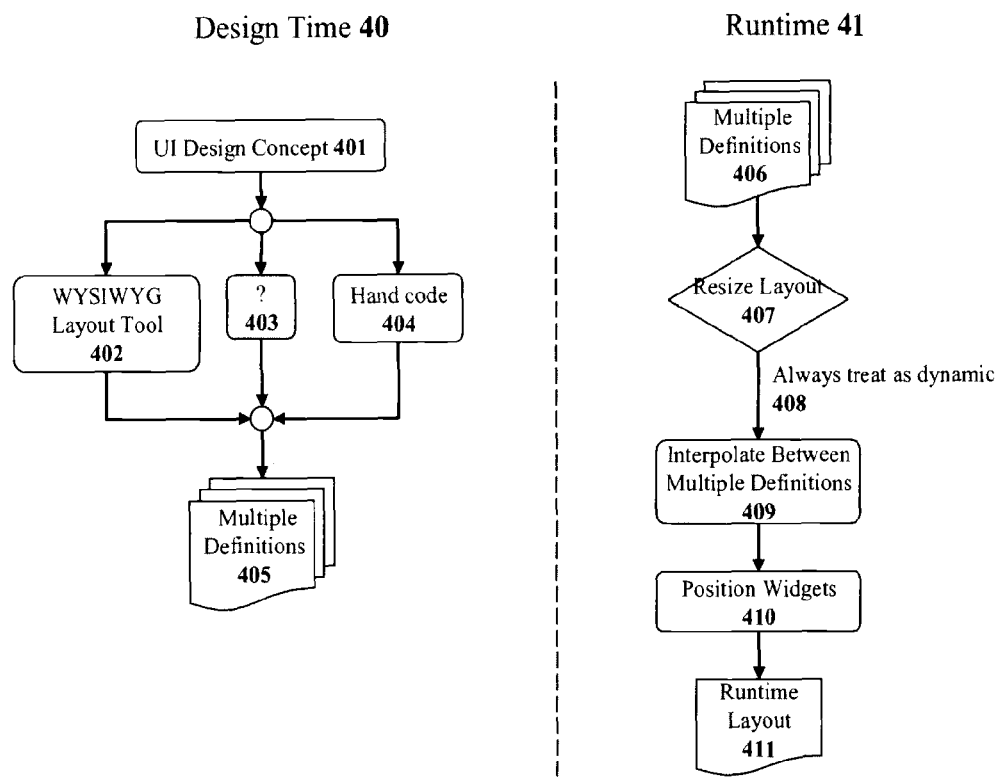
FIG. 4 includes simplified flowcharts describing methods used in certain embodiments of the invention.

FIG. 4 depicts one example of design-time 40 and runtime 41 processes for determining runtime layout 411 of user interfaces by interpolating from multiple layout definitions. The design time flowchart describes a process for specifying layout definitions input to computer software. The runtime flowchart describes how the design time layout definitions may be used to determine runtime layout. At design time, a layout design concept 401 can be provided as an input specification by any suitable method or tool including a WYSIWYG layout tool 402, by hand coding 404, or by some other process 403 that produces definitions. For example, some combination between a WYSIWYG layout tool 402 and hand coding 404 or some other process such as capturing existing layouts can be employed. The use of various specification methods may result in multiple layout definitions 405 that can be used to specify widget locations at runtime. At runtime, the multiple definitions 406, which are typically derived from design time definitions 405, can be used to position widgets. During a resize event 407 the layout can be reliably treated as a dynamic 408 layout because the layout is interpolated from multiple definitions. Where a runtime size coincides with one of the input definitions, the corresponding interpolation weight can be set to 100% for that layout and 0% for the others. The logic driving the layout resizing may determine each widget position by interpolating widget positions 409 from input layout definitions. Each widget can then be positioned 410 at newly computed locations to obtain runtime layout 411.

In certain embodiments, a process such as that shown in FIG. 4 may be used when multiple layout definitions are provided to determine the runtime layout. All layouts can be treated as dynamic layouts and layout definitions can be created either by a WYSIWYG tool or by some other means, for example, hand coding or capturing an existing UI layout in multiple states. Regardless of how they are obtained, multiple definitions can be interpolated at runtime to produce the runtime layout. Consequently, multiple layout definitions can play a direct role in computing runtime widget location rather than relying on a single layout definition to obtain the location. Considering that the interpolation method can be implemented by a widget toolkit provider, a substantial portion of the effort of specifying user interface design and repositioning logic can be transferred from the application developer to the user interface designer.

Figure 14:
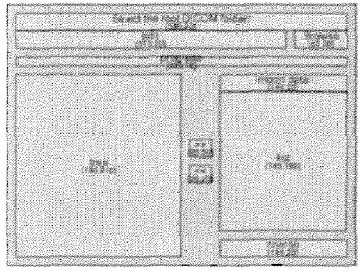
FIG. 14 depicts examples including two layout designs and their resulting runtime manifestation in certain embodiments of the invention.
Figure 14:
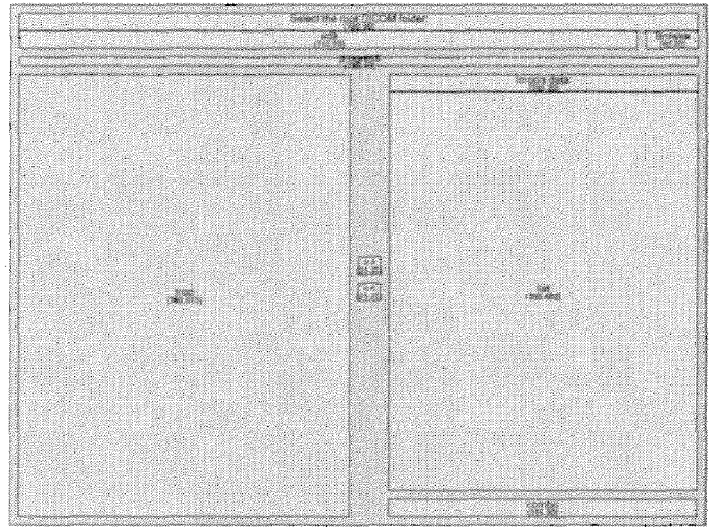
Figure 14:
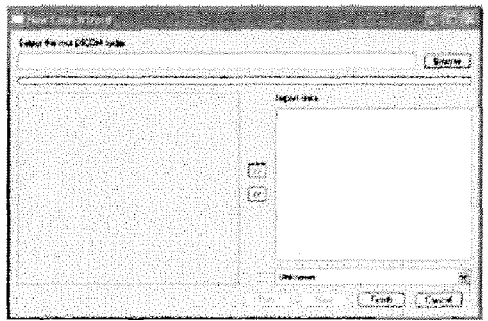
Figure 14:
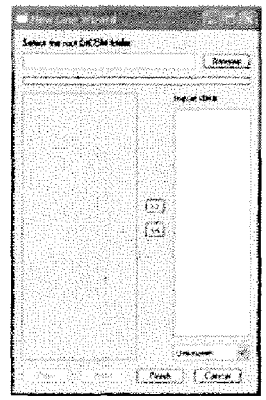
Figure 14:
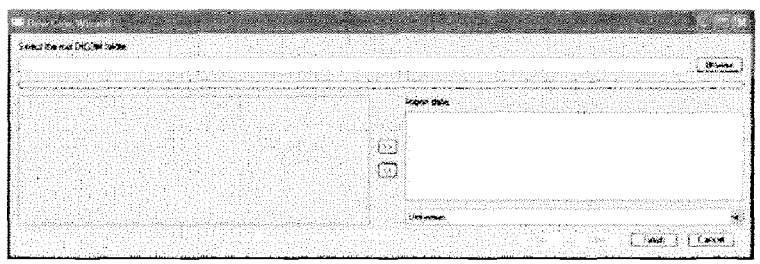

FIG. 14 shows an example user interface layouts 1403 to 1405 interpolated from two layout design definitions 1401 and 1402. Definition 1401 and definition 1402 have several widget regions delineated in their respective layouts having each widget appear in both designs; however, the widgets are positioned in locations desirable for each layout size. These designs were used in an actual application and screenshots of that application are shown. Three runtime layouts 1403 to 1405 are interpolated from the two design definitions. The layout for this example is used on a wizard where navigation buttons "Prev," "Next," "Finish," and "Cancel" have been added at the bottom using an unrelated mechanism and can be disregarded. The three runtime layouts have been fully determined by linearly interpolating between the two input definitions and were specified by the user simply resizing the wizard. These three runtime layouts represent the plurality of layouts that can be computed from the two input definitions.

Figure 5:
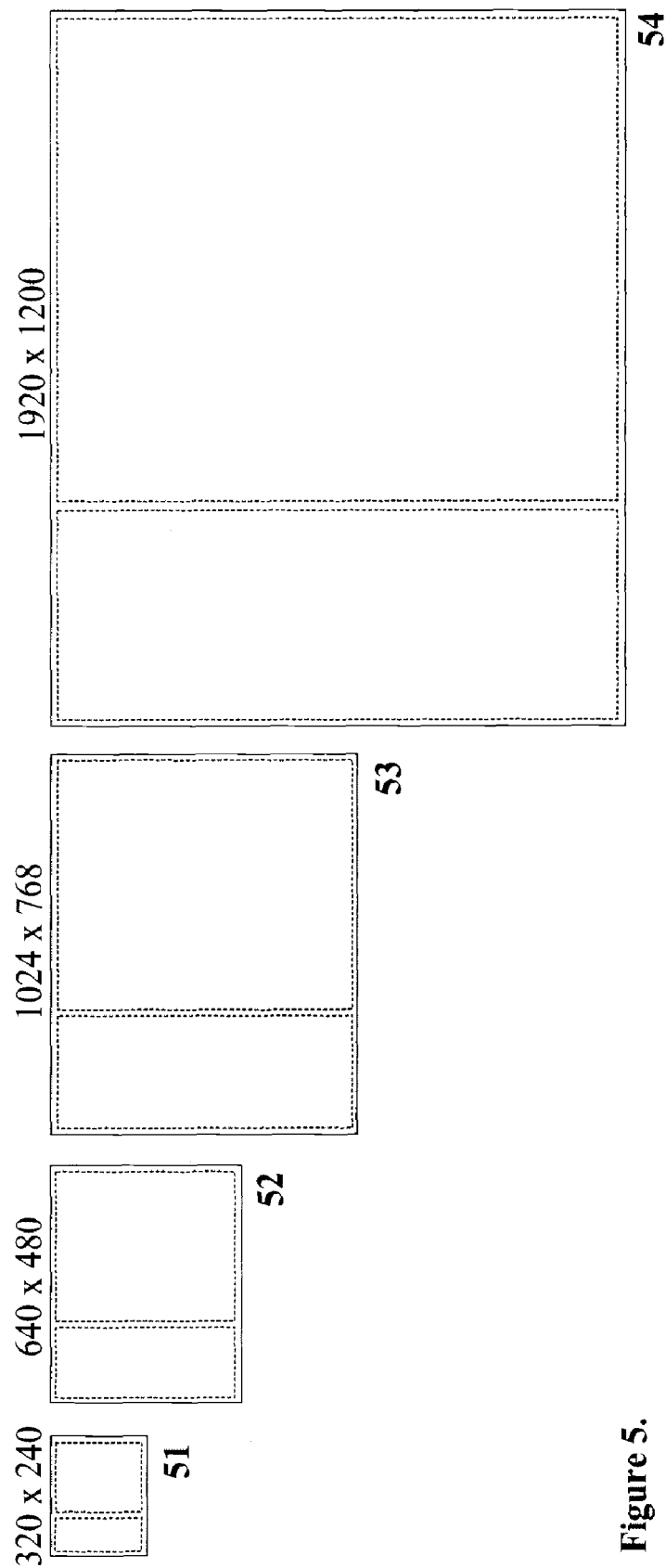
FIG. 5 shows various layout resolutions and widget regions.
Figure 6:
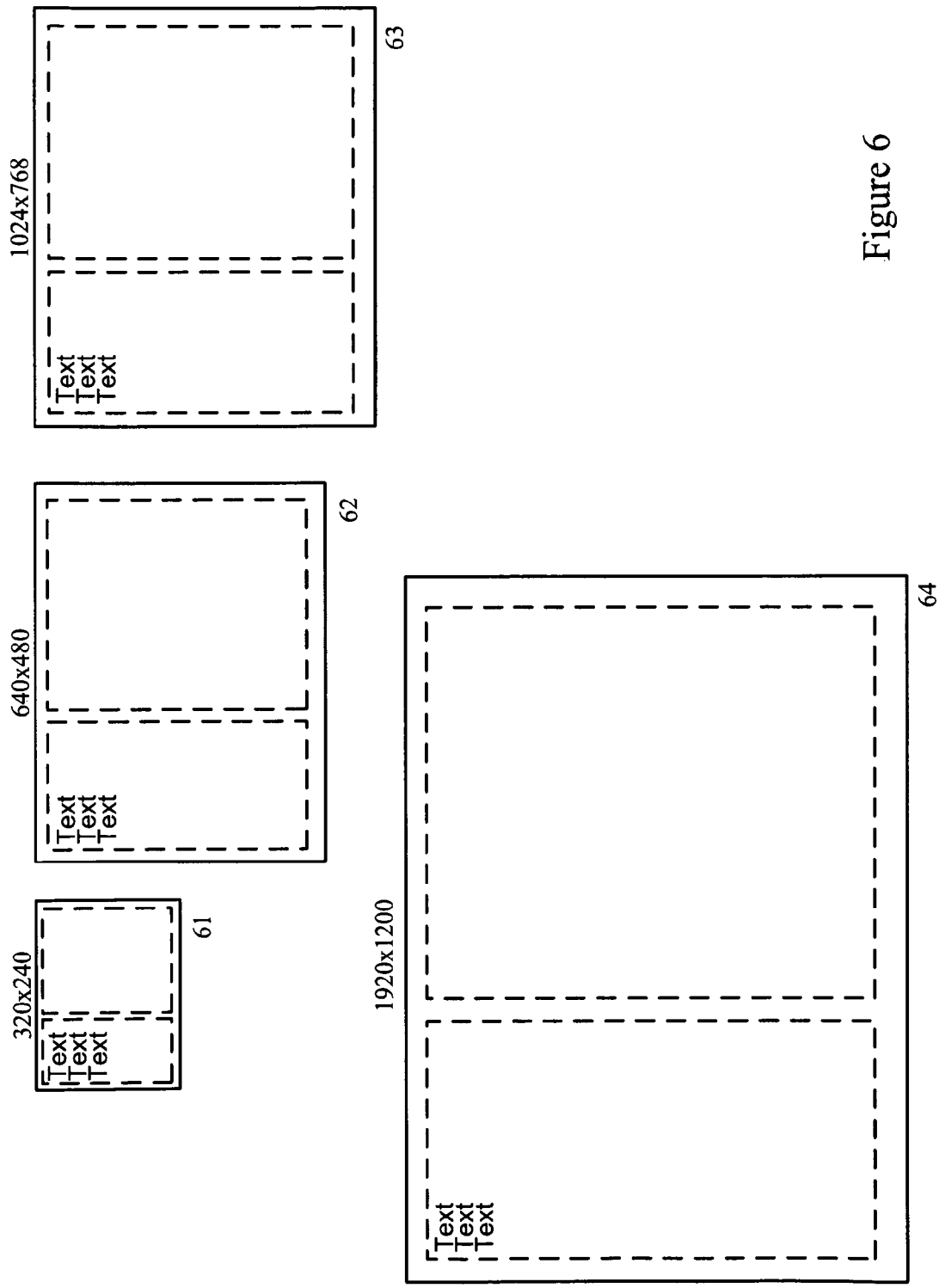
FIGS. 6-8 shows the effect of changed resolution on scaled fonts.
Figure 7:
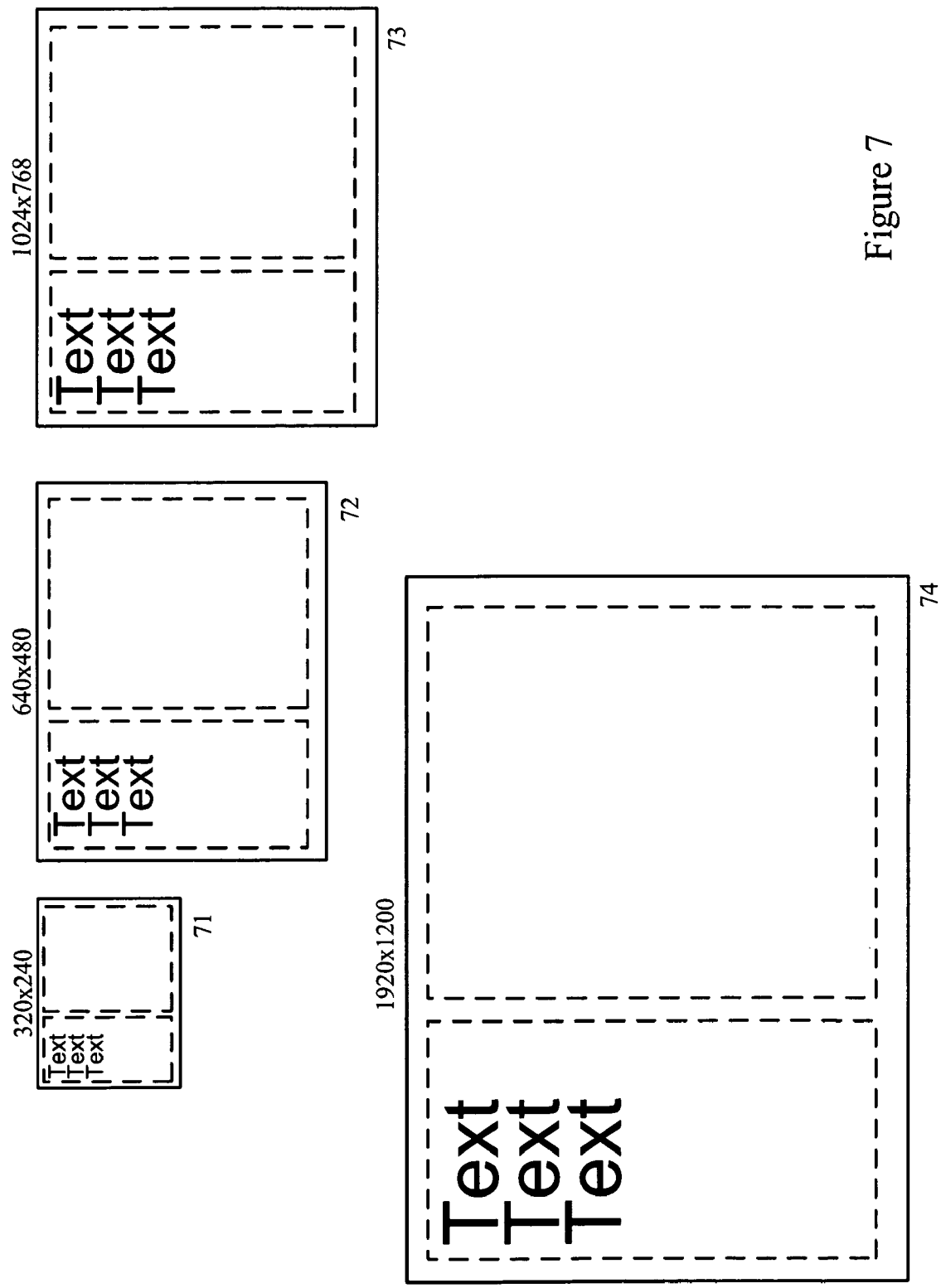
Figure 8:
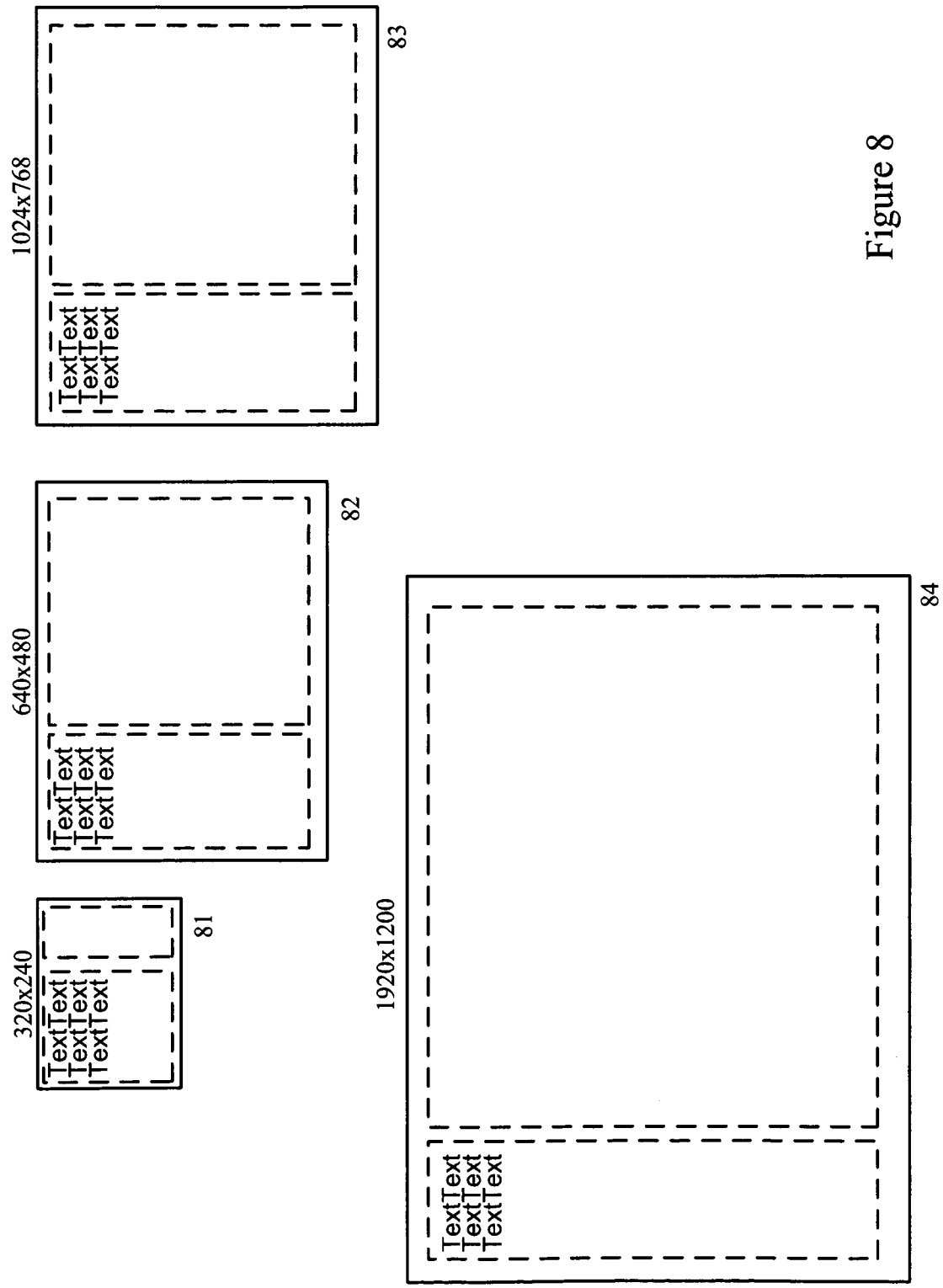

Certain embodiments provide resolution independence in user interface management and generation. The effects of display resolution are illustrated in the examples provided in FIGS. 5, 6, 7, and 8. FIGS. 5, 6 and 7 depict a resizing function that comprises a rule dividing a space into two widget regions at one third of runtime width. FIG. 8 uses an interpolation based resizing function.

FIG. 5 illustrates an example in which four layouts 51, 52, 53, and 54 having widths and heights of 320×240, 640×480, 1024×768 and 1920×1200 pixels, respectively. The same two widget regions are delineated by dotted lines on each layout. The vertical division for the widgets is located at one-third of the layout width while widget heights span the full height of the layout.

FIG. 6 illustrates an example in which four layouts 61, 62, 63, and 64 have widths and heights of 320×240, 640×480, 1024×768 and 1920×1200 pixels, respectively. The same two widget regions are delineated by dotted lines on each layout. The vertical division for the widgets is located at one-third of the layout width while widget heights span the full height of the layout. A constant 12pt font size used for each layout and where the font has a constant scale factor of 1.

FIG. 7 shows four layouts 71, 72, 73, and 74 having widths and heights of 320×240, 640×480, 1024×768 and 1920×1200 pixels, respectively. Two widget regions are delineated by dotted lines on each layout. The vertical division for the widgets is located at one-third of the layout width while widget heights span the full height of the layout. A variable font size is used for each layout. Layouts 71, 72, 73, and 74 use a factor of 0.5, 1, 1.6, and 3, respectively, for adjusting the font size. When the font is scaled by a factor of 0.5, 1, 1.6, and 3 for each resolution (based on the respective relative resolution widths) the font size will match the change in layout width relative to the 640×480 layout, as shown in FIG. 7. However, users may not always want to scale the font in this manner. For example, on large 24 in monitors having 1920× 1200 pixel resolution, such scaling would cause the text shown in the widget to occupy about 8 in of horizontal screen space thus squandering the increased pixel resolution.

A more desirable layout-resizing scheme produces that shown in FIG. 8, which holds the font size constant throughout the layout size change while resulting in a layout in which the text fits.

FIG. 8 depicts four layouts 81, 82, 83, and 84 having respective widths and heights of 320×240, 640×480, 1024×768 and 1920×1200 pixels. The same two widget regions are delineated by dotted lines on each layout. The vertical division for the widgets can vary based on the layout size while widget heights span the full height of the layout. A constant 12pt font size and a constant scale factor of 1 can be used for each layout.

Certain embodiments of the invention accommodate issues related to resolution variances. From the examples of FIGS. 5-8, it will be appreciated that issues with resolution dependence arise when widget regions vary dynamically while content scale remains constant (or vice versa) between different runtime resolutions.

Figure 9:
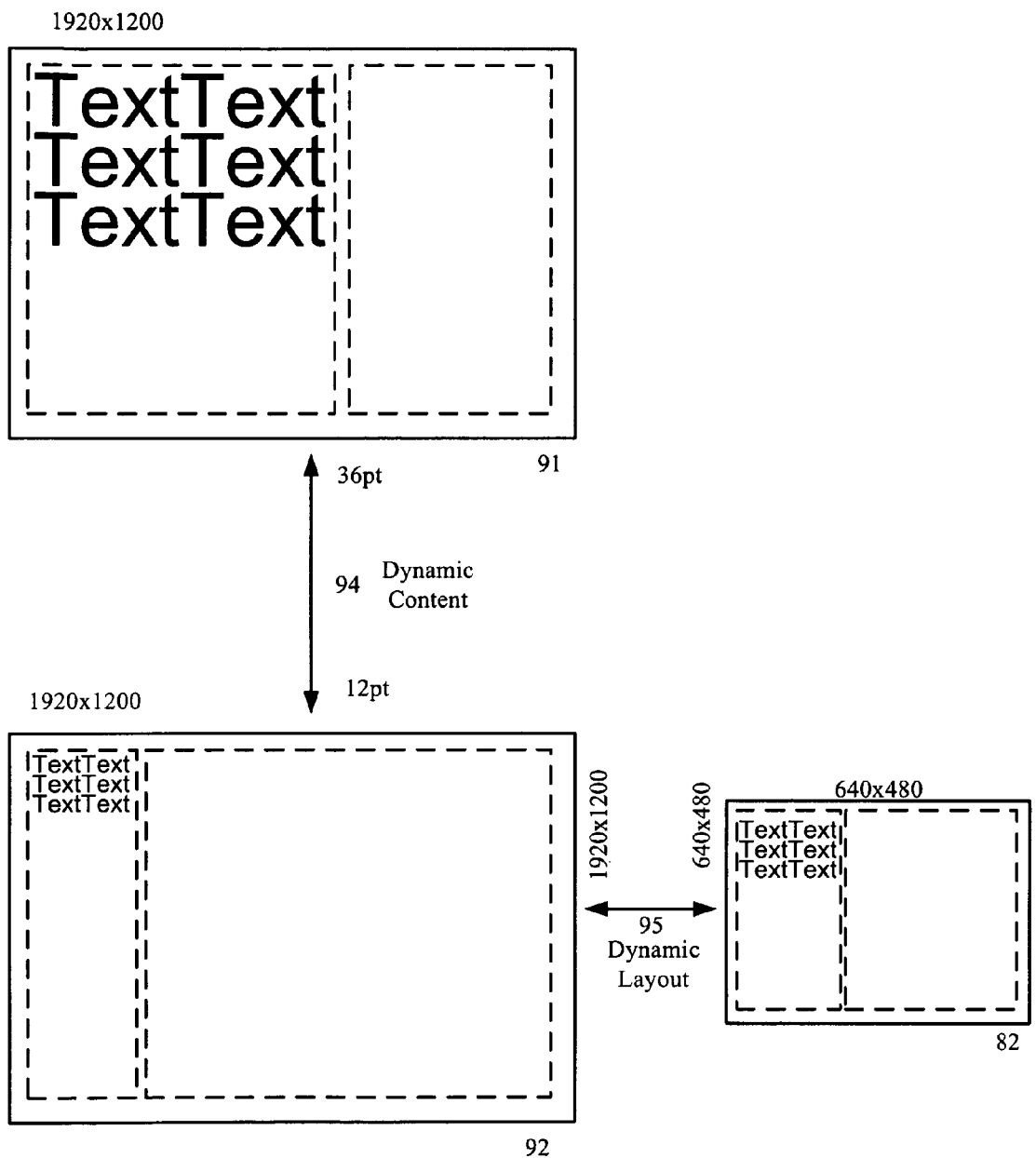
FIG. 9 illustrates a generalized method of providing resolution independence according to certain aspects of the invention.

Additionally, in some instances, combinations of content scaling and dynamic layouts shown in FIGS. 7 and 8 may be desirable. Such combinations can be achieved by creating three layout definitions that exhibit the desired results as illustrated in FIG. 9. The example of FIG. 9 demonstrates resolution independence can be achieved using three layout definitions 91, 92, and 93. In FIG. 9, widget regions are delineated by dotted lines. In certain embodiments, dynamic content 94 can be achieved by providing two or more design layouts and using two different content scales. In the example, two design layouts have the same layout dimensions of 1920×1200 pixels while content scales are defined by a 36pt and 12pt font for layouts 91 and 92, respectively. Widget locations for the two designs can be adjusted to accommodate the change in content scale as indicated by the vertical division between the two widgets.

To achieve dynamic content 95, a third design can be provided that holds constant content scale while changing layout size to 640×480 from 1920×1200 pixels for layouts 93 and 92, respectively. In this example, layout size can vary along the horizontal x-axis while the widget content size varies along the vertical y-axis. This is typically sufficient to define a resolution independent parameter space as shown in FIG. 10.

Figure 10:
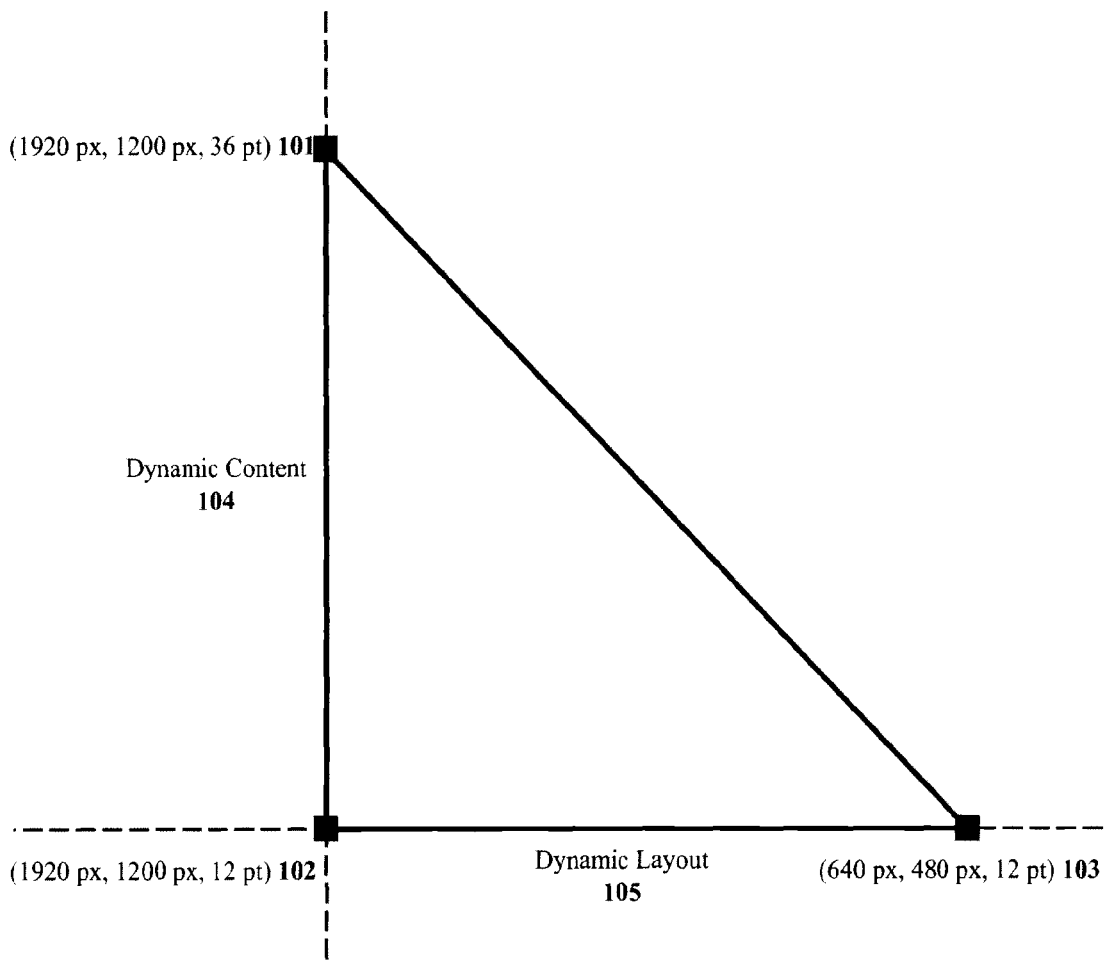
FIG. 10 illustrates a resolution independence parameter space according to certain aspects of the invention.

FIG. 10 shows a resolution independent parameter space using three layout definitions 101, 102, and 103. In the example, dynamic content 104 can be achieved by providing two design layouts having the same layout dimensions of 1920×1200 pixels and by using two different content scales defined by a 36pt and 12pt font for layouts 101 and 102, respectively. To achieve dynamic content 105, a third design is provided that holds constant content scale while changing layout size to 640×480 from 1920×1200 pixels for layouts 103 and 102, respectively. In this case, the three layout definitions form a triangular parameter space that can be represented by Barycentric coordinates. During runtime, the coordinate along the x-axis is determined for the desired layout size in addition to that of the y-axis for the content size. This identifies the corresponding interpolation weights applied to each layout definition to determine the runtime layout size.

Figure 11:
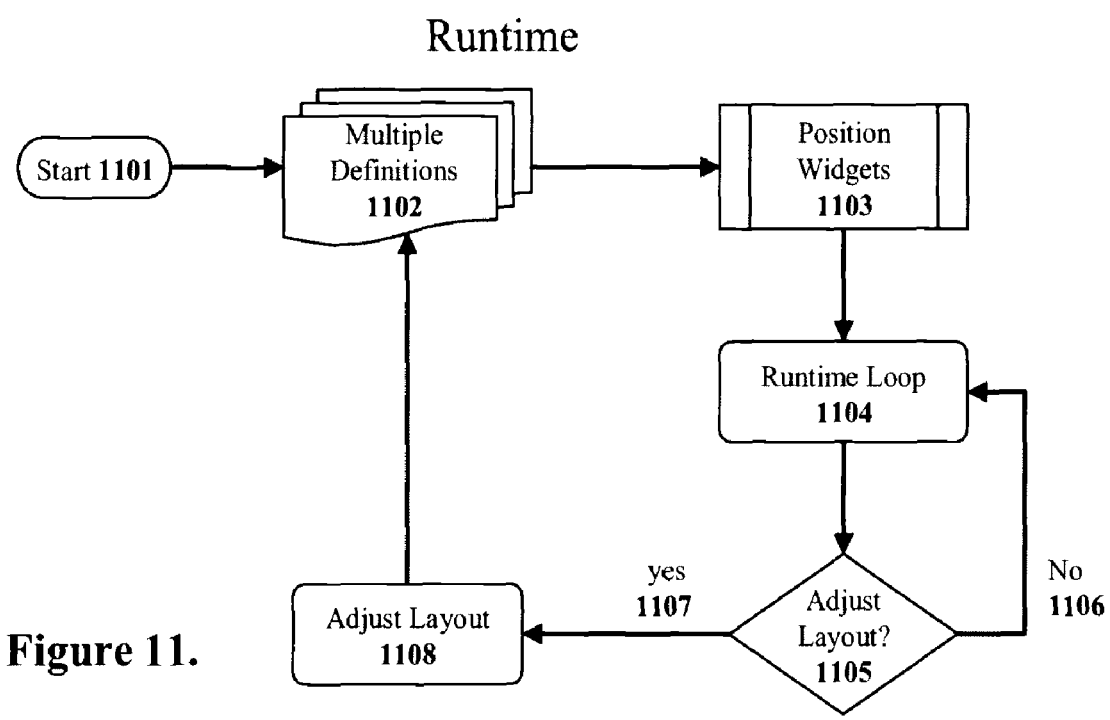
FIG. 11 depicts methods for handling resizing in certain embodiments of the invention.

According to certain aspects of the invention, some operations can be adjusted by a user at runtime. In particular, it may be desirable to allow a user to move widgets in some manner during runtime. Runtime manipulation of the input layout definitions can accommodate this desire. A flowchart illustrating on example of such a process is shown in FIG. 11. Specifically, FIG. 11 depicts an example process for runtime modification of layout definitions used to compute the runtime layout. The input layout definitions 1102 are first used to create an initial layout 1103. When a user-specified resize event 1107 is detected at step 1105, the user adjustment may be inverted and applied at step 1108 to the layout definition 1102, which can then be used to reposition widgets 1103. Either the original or a copy of the input definitions can be modified during runtime. The adjustment process at step 1108 typically uses "inverse" interpolation to determine the locations of the widget in the input layout definitions needed in order to move the widget to the desired location at runtime as specified by the user.

Certain embodiments comprise methods that use higher-order interpolation. In the examples above, linear interpolation is used for simplicity to interpolate between a plurality of layout definitions. However, in certain embodiments, higher-order interpolation methods are employed including, for example, cubic splines when at least three layout definitions are used.

Certain embodiments provide systems and methods that are useable in application spaces including, for example, HTML layout, desktop publishing and document layout, and cell phone interfaces.

HTML Layout

Figure 12:
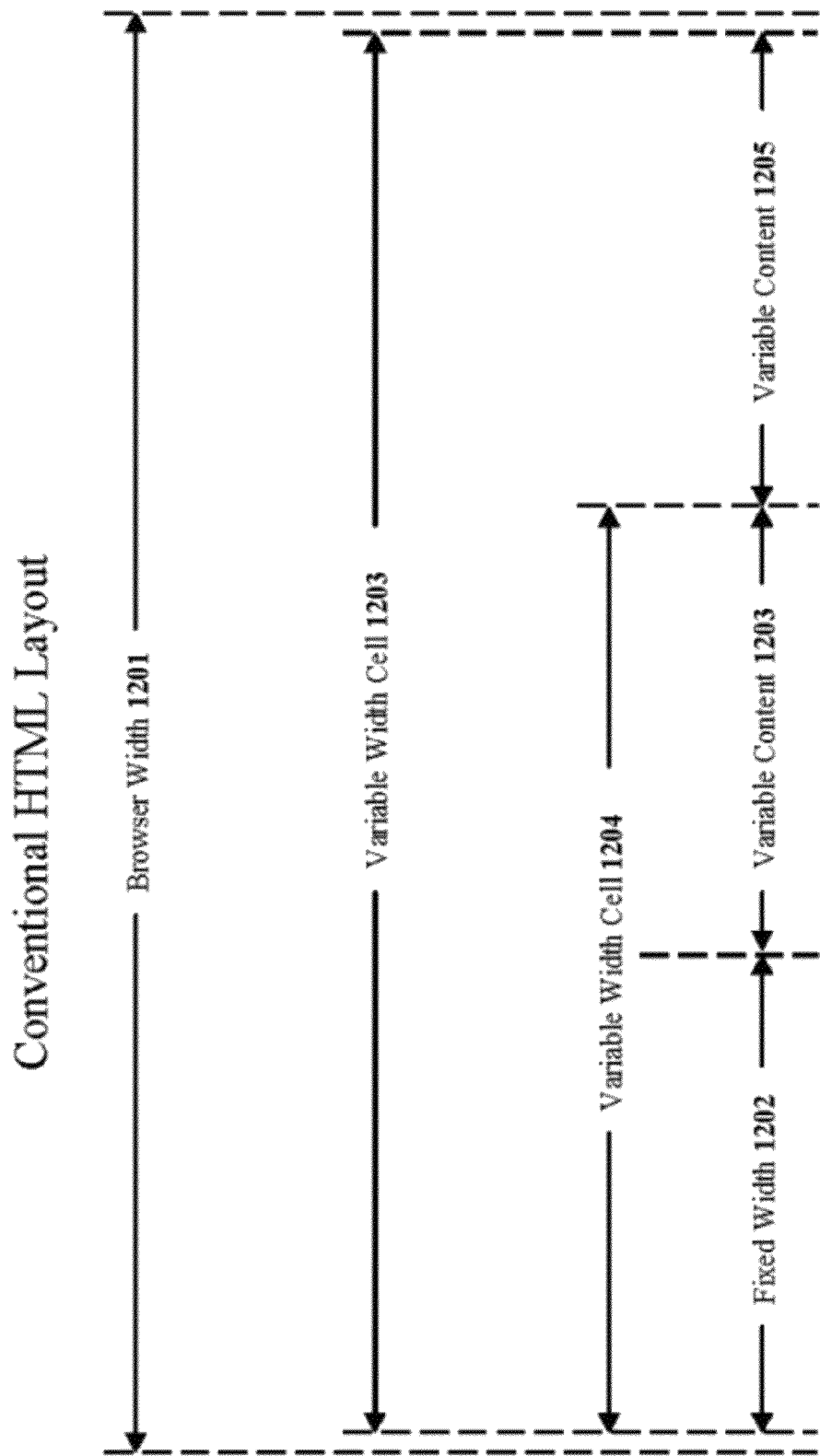
FIGS. 12-13 depict HTML layout schemes, including a resolution independent HTML layout according to certain aspects of the invention.

The conventional HTML layout approach provides a single universal layout accommodating the majority needs of visitors to a particular website. Some websites provide alternative layout configurations depending upon the user's browser window size, but none interpolate between two or more designs. Issues arise from the approach taken in HTML layouts. Conventional HTML layout can be described as a bottom-up layout mechanism where nested content size is first computed and then propagated upwards to parenting regions in turn defining their size and further propagating upwards in the hierarchy as shown in FIG. 12. FIG. 12 shows bottom-up propagation of content width or heights for an HTML layout. A depth-first computation of content size is employed in conventional HTML layout such that content regions 1202 and 1203 are computed first. This size is then propagated up to region 1204 allowing both 1204 and 1205 to determine their respective sizes. This information is then further propagated upward to 1203 to complete the layout for the given browser width 1201. It is possible for table rows or columns to designate a fixed width or height in which case these values are propagated downward. However, the size propagation is generally directed upwards. A mechanism within HTML browsers can adjust content scale, which is usually described as font size, and HTML fonts depending on this setting will vary in size and thus change the size of the overlying region within which they are contained. Consequently, resolution dependence problems are exacerbated. Furthermore, in the case of portable devices such as a cell phone or PDA, HTML browsers suffer to an even greater extent due to the small size of the screen and corresponding pixel resolution.

Figure 13:
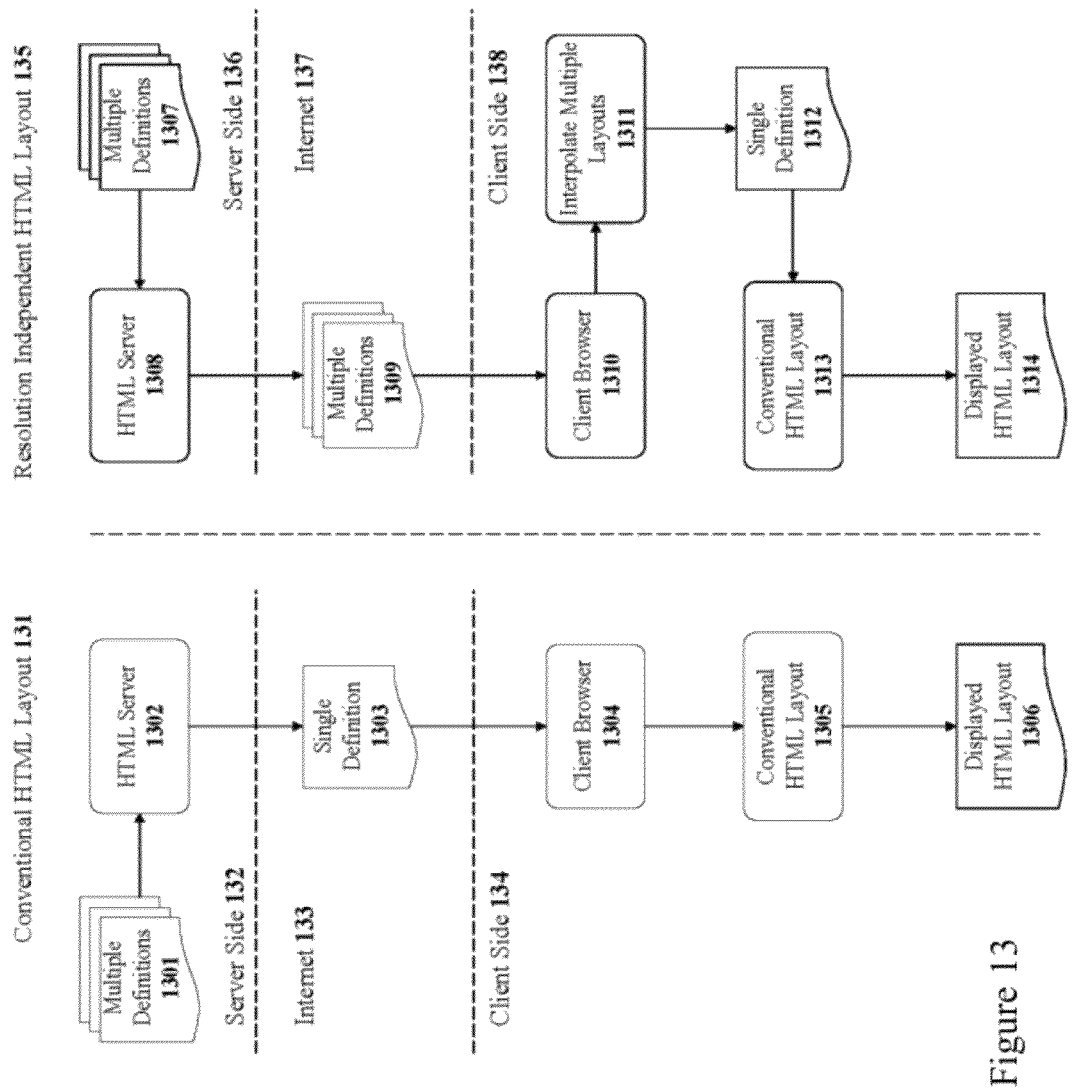

With reference to FIG. 13, certain embodiments of the invention find particular utility in handheld devices by using the tri-layout resolution independence systems and methods described. FIG. 13 shows an example comparing conventional HTML layout 131 to a resolution independent HTML layout 135 provided in certain embodiments of the invention. A client side 134 and 138 requests HTML data from the server side 132 and 136. The client side 134 and 138 and server side 132 136 communicate through the Internet 133 and 137. The conventional HTML layout method 131 can begin with either one or more layout definitions 1301 but the HTML server 1302 provides only one layout definition 1303 to the client browser 1304. This single layout then drives the conventional HTML layout process 1305 to produce the result shown in the user browser window 1306.

In certain embodiments of the invention, resolution independence 135 is achieved when the HTML server 1308 stores multiple layout definitions 137 and instead provides multiple layout definitions 1309 to the client's browser 1310. These definitions can then be interpolated 1311 according to the client's browser size 1310 producing a single layout definition 1312. This single layout drives the conventional HTML layout process 1313 producing the result shown in the user's browser window 1314.

Additional Descriptions of Certain Aspects of the Invention

Certain embodiments of the invention comprise a method for positioning a graphical object. In some of these embodiments, the method comprises selecting at least two source layouts, each source layout proportioning elements of the graphical object to be positioned, generating an interpolated layout from the at least two source layouts and positioning the graphical object in accordance with the interpolated layout to obtain a desired runtime layout of the graphical object. In some of these embodiments, the elements include widgets and the widgets are proportioned differently from one another. In some of these embodiments, the generating includes using linear interpolation. In some of these embodiments, the at least two source layouts are selected based on their relationship in size to the size of the desired runtime layout. In some of these embodiments, the elements include widget regions and content within the widget regions are scaled independently of the positioning of the widget regions. In some of these embodiments, the method further comprises adjusting the desired runtime layout responsive to user input. In some of these embodiments, the elements include widgets and wherein the adjusting includes repositioning one or more of the widgets.

Certain embodiments of the invention comprise a method for positioning a graphical object. In some of these embodiments, the method comprises a method for graphical layout comprising maintaining a plurality of different source layouts, each of the plurality of source layouts including an element in common with the other source layouts, selecting two or more of the plurality of source layouts based on characteristics of a desired runtime layout, the characteristics including size and shape of the desired runtime layout, calculating a location for the element in the desired runtime layout from corresponding locations of the element in the two or more source layouts, and positioning the element at the calculated location. In some of these embodiments, the method further comprises iteratively repeating the steps of selecting, calculating and positioning to place other elements. In some of these embodiments, the characteristics include height, width and depth of the desired runtime layout. In some of these embodiments, the depth characteristic is used depth for 3-D runtime layouts. In some of these embodiments, the calculating includes interpolating the calculated location from the corresponding locations. In some of these embodiments, the interpolating is performed using linear interpolation. In some of these embodiments, the elements include graphical objects. In some of these embodiments, the element is a widget associated with a graphical object. In some of these embodiments, the method further comprises scaling the element based on size of the element in the two or more source layouts.

Certain embodiments of the invention provide a method for locating an element in a dynamic graphical layout, comprising determining an approximate size of the element in the dynamical graphical layout, selecting a first source layout describing the element, at least one dimension of the element in the first source layout being larger than the corresponding dimension of the element in the dynamic graphical layout, selecting a second source layout describing the element, at least one dimension of the element in the second source layout being smaller than the corresponding dimension of the element in the dynamic graphical layout, and positioning the element in the dynamic graphical layout at a location calculated using the first and second source layouts. In some of these embodiments, the calculated location is interpolated from the first and second source layouts. In some of these embodiments, the selecting is based on the relative sizes of at least two dimensions of the element in the each source layout for each of the first and second source layouts. In some of these embodiments, the method, further comprises selecting one or more other source layout describing the element, at least one dimension of the element in the one or more other source layout being smaller than the corresponding dimension of the element in the dynamic graphical layout, wherein the positioning the element in the dynamic graphical layout at a location is further calculated using the one or more other source layout. In some of these embodiments, a computer readable medium encoded with data and instructions for positioning a graphical object, the data and the instructions causing an apparatus executing the instructions to execute one or more of the various methods described.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for positioning a graphical object comprising:
   selecting at least three source layouts, each source layout proportioning elements of the graphical object to be positioned, wherein at least a first two of the source layouts comprise different dimensions from each other, and wherein at least a second two of the source layouts comprise different font sizes from each other;
   generating an interpolated layout from the at least three source layouts using both the different dimensions and the different font sizes; and
   positioning the graphical object in accordance with the interpolated layout to obtain a desired runtime layout of the graphical object.

2. The method of claim 1, wherein the elements include widgets and the widgets are proportioned differently from one another.

3. The method of claim 1, wherein the generating includes using linear interpolation.

4. The method of claim 1, wherein the at least three source layouts are selected based on their relationship in size to the size of the desired runtime layout.

5. The method of claim 1, wherein the elements include widget regions and content within the widget regions are scaled independently of the positioning of the widget regions.

6. The method of claim 1, and further comprising adjusting the desired runtime layout responsive to user input.

7. The method of claim 6, wherein the elements include widgets and wherein the adjusting includes repositioning one or more of the widgets.

8. A graphical layout method comprising:
   maintaining a plurality of different source layouts, each of the plurality of source layouts including an element in common with the other source layouts, wherein at least a first two of the source layouts comprise different dimensions from each other, and wherein at least a second two of the source layouts comprise different font sizes from each other;
selecting two or more of the plurality of source layouts based on one or more characteristics of a desired runtime layout, the characteristics including size and shape of the desired runtime layout;
calculating a location for the element in the desired runtime layout from corresponding locations of the element in the two or more source layouts using both the different dimensions and the different font sizes; and
positioning the element at the calculated location.

9. The method of claim 8, and further comprising iteratively repeating the steps of selecting, calculating and positioning to place other elements.

10. The method of claim 8, wherein the characteristics include height, width and depth of the desired runtime layout.

11. The method of claim 8, wherein the calculating includes interpolating the calculated location from the corresponding locations.

12. The method of claim 11, wherein the interpolating is performed using linear interpolation.

13. The method of claim 8, wherein the elements include graphical objects.

14. The method of claim 8, wherein the element is a widget associated with a graphical object.

15. The method of claim 8, and further comprising scaling the element based on size of the element in the two or more source layouts.

16. A method of locating an element in a dynamic graphical layout, comprising:
determining an approximate size of the element in the dynamic graphical layout;
selecting a first source layout describing the element;
selecting a second source layout describing the element;
selecting a third source layout describing the element, wherein at least a first two of the first, second and third source layouts comprise different dimensions from each other, and wherein at least a second two of the first, second and third source layouts comprise different font sizes from each other; and
positioning the element in the dynamic graphical layout at a location calculated using the first and second source layouts and the approximate size of the element, and further using both the different dimensions and the different font sizes.

17. The method of claim 16, wherein the calculated location is interpolated from the first, second and third source layouts.

18. The method of claim 16, wherein for each of the first, second and third source layouts the selecting is based on the relative sizes of at least two dimensions of the element in the each source layout.

19. The method of claim 16, further comprising selecting one or more other source layout describing the element, wherein the step of positioning the element in the dynamic graphical layout includes using the one or more other source layout to calculate the location.

20. A non-transitory computer readable medium encoded with data and instructions for positioning a graphical object, said data and the instructions causing an apparatus executing the instructions to:
select at least three source layouts, each source layout proportioning elements of the graphical object to be positioned, wherein at least a first two of the source layouts comprise different dimensions from each other, and wherein at least a second two of the source layouts comprise different font sizes from each other;
generate an interpolated layout from the at least three source layouts using both the different dimensions and the different font sizes; and
position the graphical object in accordance with the interpolated layout to obtain a desired runtime layout of the graphical object.

\* \* \* \* \*